United States Patent
Nishii et al.

(10) Patent No.: US 7,732,060 B2
(45) Date of Patent: Jun. 8, 2010

(54) SHEET FOR TREATING GASEOUS INGREDIENT AND ELECTROLUMINESCENT ELEMENT EMPLOYING THE SAME

(75) Inventors: Hiroyuki Nishii, Ibaraki (JP); Hiroaki Mashiko, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 10/483,063

(22) PCT Filed: Jul. 16, 2001

(86) PCT No.: PCT/JP01/06141

§ 371 (c)(1),
(2), (4) Date: Jan. 7, 2004

(87) PCT Pub. No.: WO03/008094

PCT Pub. Date: Jan. 30, 2003

(65) Prior Publication Data

US 2004/0180236 A1    Sep. 16, 2004

(51) Int. Cl.
*B01D 53/04* (2006.01)
*B01D 69/14* (2006.01)
*B01J 20/28* (2006.01)
*H01L 51/54* (2006.01)

(52) U.S. Cl. .................... 428/690; 428/917; 313/512; 204/157.3; 204/641; 423/215.5

(58) Field of Classification Search ................ 428/690, 428/917, 76, 304.4, 343; 313/504, 506, 512
See application file for complete search history.

(56) References Cited

U.S. PATENT DOCUMENTS

| | | | | |
|---|---|---|---|---|
| 2,400,091 A | * | 5/1946 | Alfthan | 264/115 |
| 3,844,737 A | * | 10/1974 | Macriss et al. | 95/93 |
| 3,890,417 A | * | 6/1975 | Vallance | 264/49 |
| 4,485,133 A | * | 11/1984 | Ohtsuka et al. | 206/0.7 |
| 4,498,961 A | * | 2/1985 | Lazarz et al. | 205/523 |
| 4,740,219 A | | 4/1988 | Kulprathipanja et al. | |
| 4,830,643 A | | 5/1989 | Sassa et al. | |

(Continued)

FOREIGN PATENT DOCUMENTS

EP    1 079 666 A2    2/2001

(Continued)

OTHER PUBLICATIONS

"Silica gel." Encyclopedia Bitannica. 2007. Encyclopedia Britannica Online. Mar. 2007 <http://britannica.com/eb/article-9067758>.*

(Continued)

*Primary Examiner*—Dawn L Garrett
(74) *Attorney, Agent, or Firm*—Westerman, Hattori, Daniels & Adrian, LLP

(57) ABSTRACT

A gaseous component treatment sheet of the present invention has a gas-permeable base film and a particulate remover for removing a predetermined gaseous component, and the particulate remover is dispersed in the base film. A protective layer and/or an adhesive layer can be laminated further on the base film. Since the gaseous component treatment sheet is a sheet-like member including the base film for holding the particulate remover, the size and the shape can be adjusted easily.

12 Claims, 3 Drawing Sheets

U.S. PATENT DOCUMENTS

| | | | |
|---|---|---|---|
| 4,833,195 A * | 5/1989 | Adur et al. | 524/528 |
| 4,866,672 A * | 9/1989 | Terao et al. | 369/194 |
| 5,189,405 A * | 2/1993 | Yamashita et al. | 313/512 |
| 5,700,375 A | 12/1997 | Hagen et al. | |
| 5,990,615 A * | 11/1999 | Sakaguchi et al. | 313/504 |
| 6,059,860 A * | 5/2000 | Larson | 95/117 |
| 6,117,328 A | 9/2000 | Sikdar et al. | |
| 6,525,339 B2 * | 2/2003 | Motomatsu | 257/40 |
| 6,737,176 B1 * | 5/2004 | Otsuki et al. | 428/690 |
| 2001/0026853 A1 | 10/2001 | Nishii et al. | 428/36.5 |
| 2001/0028218 A1 | 10/2001 | Mashiko et al. | 313/553 |

FOREIGN PATENT DOCUMENTS

| | | |
|---|---|---|
| JP | 55-13160 | 1/1980 |
| JP | 55-13160 A | 1/1980 |
| JP | 55-016058 A * | 2/1980 |
| JP | 55-158933 | 12/1980 |
| JP | 55-158933 A | 12/1980 |
| JP | 2-78433 | 3/1990 |
| JP | 2-78433 A | 3/1990 |
| JP | 2-94322 | 4/1990 |
| JP | 2-94322 A | 4/1990 |
| JP | 4-210232 | 7/1992 |
| JP | 4-210232 A | 7/1992 |
| JP | 8-024637 A | 1/1996 |
| JP | 10-57807 | 3/1998 |
| JP | 10-57807 A | 3/1998 |
| JP | 11-33342 | 2/1999 |
| JP | 11-33342 A | 2/1999 |
| JP | 11-57377 A | 3/1999 |
| JP | 03067080 B2 | 5/2000 |
| WO | WO 00/06663 * | 2/2000 |

OTHER PUBLICATIONS

Office Action mailed Nov. 28, 2007 in Corresponding European Patent Application No. 01 949 998.7.

* cited by examiner

SHEET FOR TREATING GASEOUS INGREDIENT AND ELECTROLUMINESCENT ELEMENT EMPLOYING THE SAME

TECHNICAL FIELD

The present invention relates to a gaseous component treatment sheet for reducing a predetermined gaseous component, and an electroluminescent (hereinafter, referred to as "EL") element using the gaseous component treatment sheet.

BACKGROUND ART

Conventionally, displays and light emitting elements used in mobile equipment or the like include EL elements (electroluminescent elements) as illuminants. However, such an EL element has a disadvantage, that is, the initial light emitting performance in light emission luminance, light-emission uniformity or the like deteriorates considerably due to the use at a high temperature or aging. This deterioration in the light-emitting performance is caused by a dark spot within the EL element. The dark spot is a portion not emitting light, and it is formed due to moisture adsorbed on the surface of the constituents or the materials, and also due to water vapor, oxygen and organic vapor entering from exterior.

Regarding a hard disk for a computer, the disk drive head will be damaged due to the internal fine particles and the disk surface will be soiled by the organic vapor.

The above-mentioned problems can be solved by the use of an adsorptive member that is manufactured by encapsulating an adsorbent for adsorbing organic vapors or the like in a porous container. For example, JP 11(1999)-57377 A describes in FIG. 6 an adsorbent-encapsulating porous vessel that holds an adsorbent 52 in a vessel formed by sealing the peripheral parts of a pair of polytetrafluoroethylene (hereinafter, referred to as 'PTFE') porous films 51.

For corresponding to miniaturization of mobile equipment and the trend for automated attachment of adsorptive members, the EL element and adsorptive members to be incorporated in the EL element are preferably adjustable in size and shape. However, since the above-described conventional adsorptive members are shaped as vessels, the sizes and shapes have been under a certain restriction. The restriction causes difficulty in adjustment of the sizes and shapes of the EL elements.

DISCLOSURE OF INVENTION

In view of the above-mentioned circumstances, an object of the present invention is to provide a gaseous component treatment sheet that can be adjusted easily in size and shape, and an EL element using the gaseous component treatment sheet.

For achieving the above-mentioned object, the gaseous component treatment sheet of the present invention has a gas-permeable base film and particulate remover for removing a predetermined gaseous component, and the particulate remover is dispersed in the base film.

The gaseous component treatment sheet can be adjusted easily in size and shape since the base film is a sheet-like member that holds the particulate remover.

The gaseous component treatment sheet of the present invention corresponds to the trend for a small and thin EL element. The present invention provides also an EL element having the gaseous component treatment sheet, though the intended use of the gaseous component treatment sheet of the present invention is not limited to an EL element.

PREFERRED EMBODIMENT OF THE INVENTION

Preferred embodiments according to the present invention will be described below by referring to the attached drawings.

Figure 1:
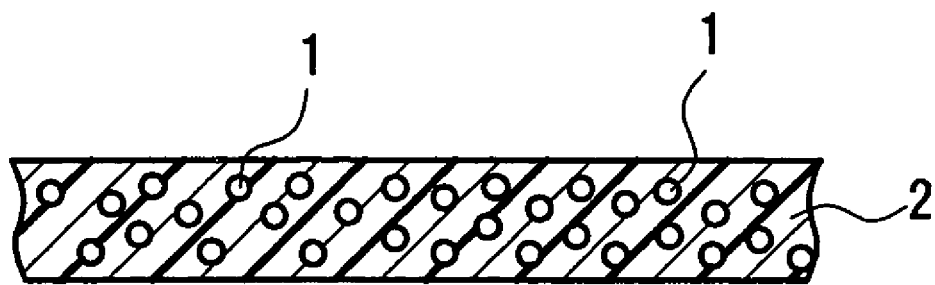
FIG. 1 is a cross-sectional view showing an embodiment of a gaseous component treatment sheet according to the present invention.

The gaseous component treatment sheet (hereinafter, referred to as "treatment sheet") in FIG. 1 is made of a gas-permeable base film 2 that holds particulate remover 1 for removing a gaseous component. Though the particle diameter of the remover 1 can be set suitably, it is generally about 0.1 μm to about 1000 μm.

The base film can be porous or non-porous as long as it has gas permeability. Since a porous film is effective in improving the permeability rate of the gaseous component, efficiency in removing the gaseous component can be improved. Though the material of the base film is not limited specifically as long as it is gas-permeable, a resin film is used suitably, since in many cases, resin films, even if being non-porous, have gas permeability.

A polyolefin-based resin is preferred for the material of the base film, since it is inexpensive, easy to recycle after using, and enables control of the pore diameter so as to prevent shedding of the particulate remover even when pores are formed. Particularly-preferred examples thereof include a polyethylene, a polypropylene, poly 4-methyl-1-pentene and poly-1-butene, since the resins have excellent workability and they are easy to form porous films to control the pore diameter. These polyolefin-based resins can be homopolymers or copolymers. Two or more kinds of the polyolefin-based resins can be blended in use. In this context, a polyolefin resin refers to a resin containing at least 50% of a polyolefin-based resin in weight.

For the material of the base film, a fluorine resin is preferred because of the excellent heat resistance and excellent usefulness at a high temperature, and PTFE is preferred especially.

As mentioned above, it is preferred that the base film is made of at least one resin selected from the group consisting of a polyolefin-based resin and a fluorine resin. The base film is not limited to a monolayer, but it can consist of multiple layers.

Typically, a suitable thickness for the base film ranges from about 1 μm to about 5000 μm. When the base film is a porous film, the average pore diameter is suitably from about 0.01 μm to about 100 μm.

When the base film is a PTFE porous film and applied alone without using any of the protective layer mentioned below, it is preferable that the PTFE porous film has a thickness of not less than 10 μm in view of the strength. The thickness is preferably not more than 1000 μm in view of the productivity. The average pore diameter of the PTFE porous film is preferably not more than 10 μm in order to hold the particulate remover, though it depends on the particle diameter of the remover. In view of the gas permeability, it is preferable that the average pore diameter is at least 0.01 μm.

Though the remover is not limited specifically as long as it can remove the gaseous component, preferably, it has a function of removing at least one component selected from the group consisting of water vapor, oxygen and an organic vapor. The remover can be a general-purpose compound used for an adsorbent, a moisture absorbent (desiccant), an oxygen remover (oxygen absorbent) or the like.

Examples of the adsorbent include activated carbon, silica gel, zeolite, and activated alumina.

The moisture absorbent can include, for example, a material that physically adsorbs moisture, or a material that chemically reacts with moisture (e.g., a material that reacts with water irreversibly so as to form a water-free compound, and a material that is combined with water reversibly so as to form a hydrate). Specific examples of the desiccant include silica gel, molecular sieves (e.g., zeolite), activated alumina, alkali metal oxides, alkaline earth metal oxides, diphosphorus pentaoxide, calcium hydride, and lithium aluminum hydride. Sulfites (e.g., calcium sulphate), carbonates (e.g., calcium carbonate), metal halides, perchlorate, organic substances or the like, can be used as well.

Examples of the oxygen remover include activated carbon, silica gel, zeolite, activated alumina, molecular sieves, magnesium oxide, and iron oxide.

Examples of suitable removers used for removing the organic vapor include activated carbon, silica gel, zeolite, and molecular sieves. Any of the above-mentioned materials can be mixed to form a remover.

Figure 2:
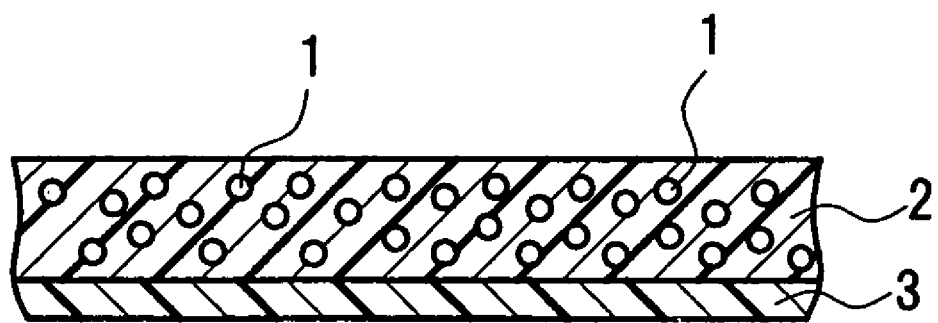
FIG. 2 is a cross-sectional view showing another embodiment of a gaseous component treatment sheet according to the present invention.

The treatment sheet shown in FIG. 2 includes a gas-permeable base film 2 containing a particulate remover 1 dispersed therein and a gas-permeable protective layer 3 laminated on the base film 2.

Similarly to the base film, this protective layer can be a porous film or a non-porous film as long as it has gas permeability. Since the permeation rate of the gaseous component is improved by the use of the porous film, efficiency in removing the gaseous component can be improved.

For the reason as described regarding the base film, it is preferable that the protective layer is made of a polyolefin-based resin or a fluorine resin (particularly, PTFE). Alternatively, a non-woven fabric, a mesh, a woven fabric, paper and a porous material of polyolefin-based resin or the like can be used.

The remover may be shed from the base film, depending on the type and dispersion amount of the remover, or depending on the pore diameter of the porous film. Depending on the type of the remover, shedding of a remover will affect adversely the El element or the like. Therefore, it is preferable to dispose a protective layer in order to hold the remover within the sheet, though the protective layer is not an essential element. The protective layer can function also as a reinforcer for the base film. It is particularly preferable to dispose a protective layer for reinforcement when the base film is porous.

In the embodiment shown in FIG. 2, a surface that is not provided with a protective layer is used in general as a surface to adhere to an element. As described below, this surface can be provided previously with an adhesive layer. Alternatively, an adhesive layer can be provided in an EL element so that a surface of the base film having no protective layer can be adhered via this adhesive layer.

Figure 3:
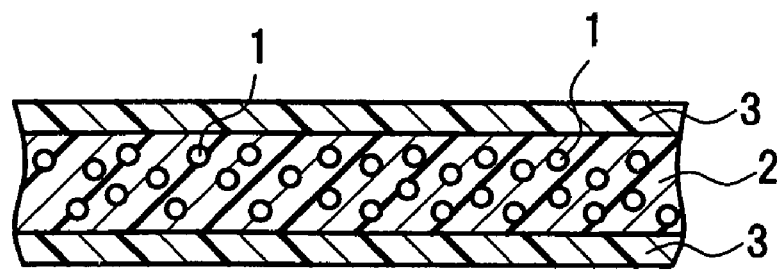
FIG. 3 a cross-sectional view showing a third embodiment of a gaseous component treatment sheet according to the present invention.

As shown in FIG. 3, protective layers 3 can be disposed on both surfaces of the base film 2. In this case, at least one of the protective layers is required to have gas permeability. When a non-permeable protective layer is disposed on a surface of the base film, the surface with the protective layer will be placed closer to an element.

In the embodiments as shown in FIGS. 2 and 3, the base film 2 containing the remover 1 functions as a gas treatment layer, while the protective layer 3 containing no remover functions as a layer for reinforcement, gas-permeation and prevention of shedding of remover.

The base film containing a dispersed remover can be prepared by a suitable method, depending on whether the base film is non-porous or porous, and depending on the material of the base film. With respect to typical materials, methods of producing base films will be described below.

When the base film is a non-porous film and the material is a polyolefin-based resin, the base film can be produced, for example, by mixing a particulate remover in a pellet of the polyolefin-based resin and melt-extruding the mixture.

When the base film is a porous film and the material is a polyolefin-based resin, methods as described below can be applied. For example, in a dry film formation method, a particulate remover is mixed in a polyolefin-based resin pellet and the mixture is melt-extruded, and furthermore the extrusion is stretched at low temperature and then at high temperature. In a wet film formation method, a particulate remover, a polyolefin-based resin and an agent-to-be-extracted are mixed to be subjected to processes such as molding and stretching, and subsequently the agent-to-be-extracted is extracted and removed by the use of a solvent or the like. In an alternative method, a particulate remover and a particulate polyolefin-based resin are mixed, and the mixture is melt-welded while being applied with heat and pressure so as to form a porous block, which will be sliced to form films.

When the base film is a non-porous film and the material is PTFE, for example, methods as described below can be applied. For example, a particulate remover and a PTFE fine powder are mixed and a proper amount of extrusion auxiliary agent is added to the mixture. A preform (e.g., bullet-like) formed from the mixture is extruded to form a plate or a round bar from a die of an extruder. This paste is rolled to form a film having a predetermined thickness, and subsequently the extrusion auxiliary agent is removed. In an alternative method, a particulate remover and a PTFE powder are mixed and the mixture is molded to have a predetermined shape, then the thus obtained molding is fired and sliced to form films. In an alternative method, a base material is passed through a dispersion of a PTFE fine powder mixed with a particulate remover so that the PTFE fine powder becomes a coating film of a predetermined thickness. The coating film on the base material is fired and peeled off from the base material.

When the base film is a porous film and the material is PTFE, methods as described below can be applied. For example, a particulate remover and a PTFE fine powder are mixed and a proper amount of extrusion auxiliary agent is added to the mixture. A preform (e.g., bullet-like) formed from the mixture is extruded to form a plate or a round bar from a die of an extruder. This paste is rolled to have a predetermined thickness and subsequently stretched to form pores at a predetermined temperature. Alternatively in this case, the paste can be fired after the stretching. In an alternative method, a base material is passed through a dispersion of a PTFE fine powder mixed with a particulate remover to be provided with a coating film of the PTFE fine powder. The coating film on the base material is then fired, peeled off from the base material and subsequently stretched at a predetermined temperature. In an alternative method, a particulate remover is mixed in a PTFE powder containing a filler such as a glass fiber. The mixture is molded to a predetermined shape, which is fired, and then sliced to form films.

The method including stretching for forming pores is suitably applied to a case of using a remover with a small particle diameter, since the pore diameter of the porous film can be decreased.

A protective layer can be provided, for example, by laminating at a predetermined temperature, adhering the base film and the protective layer at points via an adhesive, or by a melt-adhesion via a binder such as a net. Alternatively, the base film and the protective layer can be melt-extruded simultaneously so as to form a film.

Figure 4:
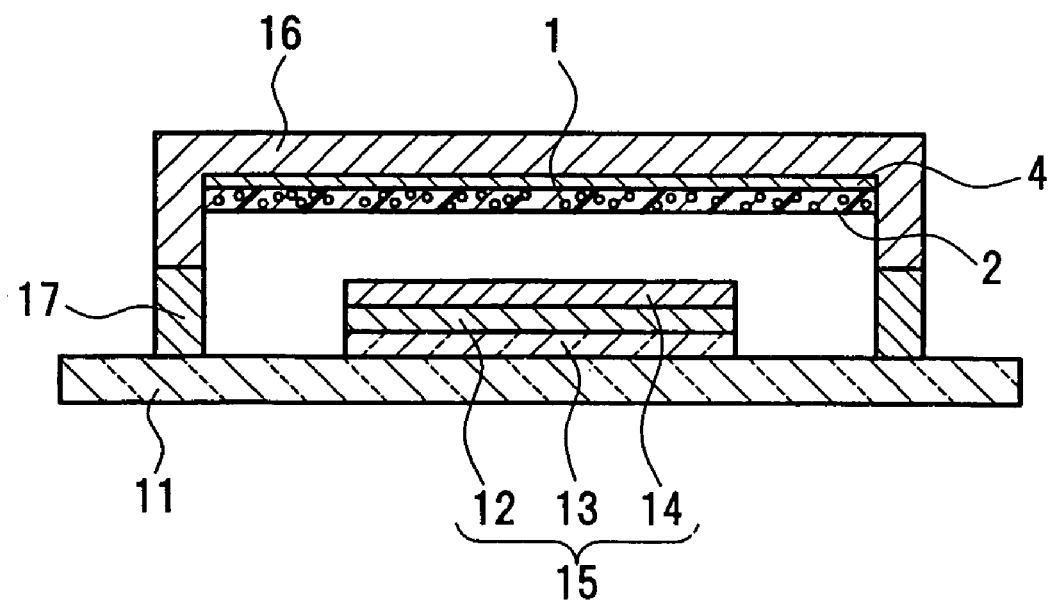
FIG. 4 is a cross-sectional view showing an embodiment of an EL element according to the present invention.
Figure 5:
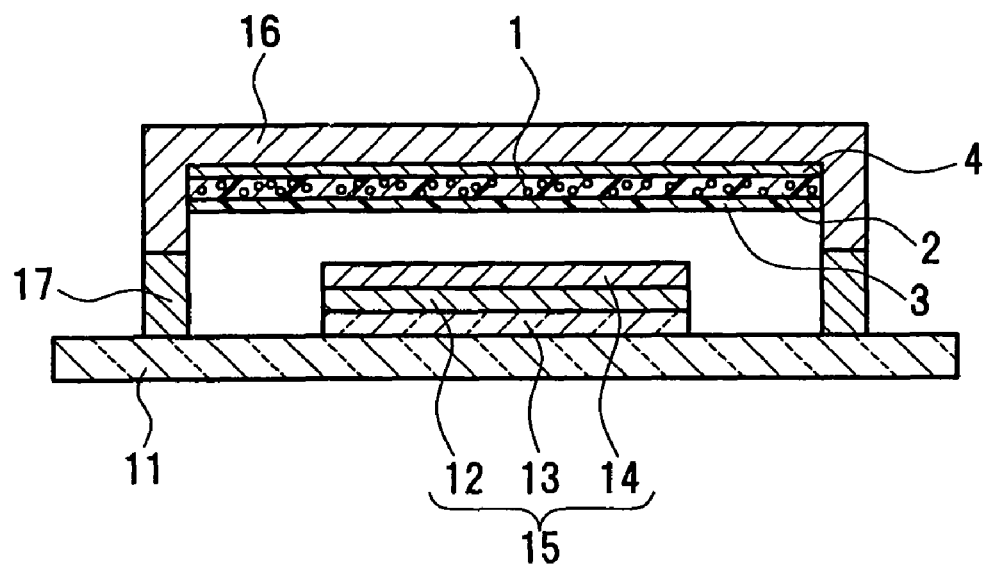
FIG. 5 is a cross-sectional view showing another embodiment of an EL element according to the present invention.
Figure 6:
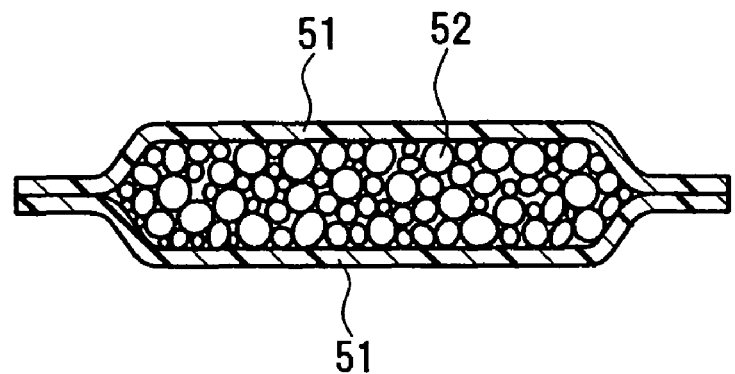
FIG. 6 is a cross-sectional view showing a conventional adsorptive member.

The thus produced treatment sheet is formed to have a predetermined size and shape and, for example, as shown in FIGS. 4 and 5, it is disposed within an EL element. The EL element includes a transparent substrate 11 on which a laminate (EL) 15 is provided. The laminate 15 is formed by sandwiching an organic light-emitting layer 12 with an anode 13 and a cathode 14. A back plate 16 is arranged to cover the laminate 15, and the back plate 16 is sealed at the periphery with the substrate 11 through a sealing agent 17. The treatment sheet is fixed onto the inner surface of the back plate 16 through the adhesive layer 4. Due to this configuration, gaseous components such as moisture entering the EL element to cause dark spots will be decreased by the remover 1.

In the above-mentioned EL element, light is emitted through the substrate. The present invention is not limited to this configuration, but it can be applied to an EL element emitting light through the surface opposite to the substrate, or an EL element emitting light through the both surfaces.

Though there is no specific limitation for the adhesive layer, a pressure-sensitive adhesive is used preferably. Materials based on silicone, acrylic resins, or rubbers can be used for the pressure-sensitive adhesive. To decrease the influence of the organic gas on the EL laminate 15, an ultraviolet-curing type pressure-sensitive adhesive (generally based on acrylic materials) is used suitably.

A base material including a non-woven fabric, a resin film, paper, a metal foil or the like can be disposed within the adhesive layer so as to improve further the strength of the treatment sheet. The improved strength results in improvement in workability during a process of attaching the treatment sheet.

The adhesive layer can be formed on the entire surface of the treatment sheet. Alternatively, it can be formed partially, for example, only at the periphery. When the adhesive layer is formed previously on the treatment sheet, the adhesive layer is disposed as an outermost layer of the treatment sheet. When a protective layer is disposed further, the treatment sheet is formed by laminating an adhesive layer 4, a base film 2 and a protective layer 3 in this order as shown in FIG. 5, and a protective layer is provided as an outermost layer opposite to the adhesive layer. An additional protective layer can be disposed between the adhesive layer and the base film.

The treatment sheet of the present invention can be processed to have a predetermined shape easily by punching or the like. Since the treatment sheet functions to treat gaseous components, it can be used without being subjected to additional processes, e.g., a process for forming a container. Therefore, the size and shape can be selected arbitrarily.

As a result, a small and thin EL element can be produced, and thus a trend for small and thin mobile equipment including EL elements can be coped with easily.

For fixing gaseous component treatment sheets to the interior of an EL element, it is convenient to prepare a gaseous component treatment sheet assembly by disposing a plurality of treatment sheets on a peeling base material (e.g., a tape like base material). In this case, the treatment sheets are processed previously to have a predetermined shape by punching or the like. This member can be produced by fixing the treatment sheets in a state that the adhesive layer is in contact with the peeling base material. This member is stored and transported in a state of being wound as required. This member can be applied easily to an EL element manufacturing line using an automated mounting device. As mentioned above, the treatment sheet of the present invention, which can be picked up by an automated mounting device, serves to improve efficiency in manufacturing an EL element.

The present invention may be embodied in other forms without departing from the spirit or essential characteristics thereof The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

The invention claimed is:

1. A gaseous component treatment sheet comprising a gas-permeable base film and a particulate remover for removing a predetermined gaseous component, the particulate remover being dispersed in the base film, and comprising an adhesive layer, and the adhesive layer is arranged as an outermost layer,
   wherein the base film is a stretched porous film comprising polytetrafluoroethylene,
   wherein the average pore diameter of the base film is from about 0.01 microns to about 100 microns,
   wherein the gaseous component treatment sheet further comprises a gas-permeable protective layer, and the protective layer is laminated on the base film, and
   wherein the protective layer (i) does not contain particulate remover, and (ii) holds the particulate remover within the base film.

2. The gaseous component treatment sheet according to claim 1, wherein the particulate remover has a function of removing at least one component selected from the group consisting of water vapor, oxygen and an organic vapor.

3. The gaseous component treatment sheet according to claim 1, wherein the protective layer is a porous film.

4. The gaseous component treatment sheet according to claim 1, wherein the protective layer is arranged as an outermost layer opposite to the adhesive layer.

5. The gaseous component treatment sheet according to claim 4, wherein the particulate remover has a function of removing at least one component selected from the group consisting of water vapor, oxygen and an organic vapor.

6. The gaseous component treatment sheet according to claim 4, wherein the protective layer is a monolayer laminated directly on the base film and the protective layer reinforces the base film.

7. A gaseous component treatment sheet assembly comprising gaseous component treatment sheets according to claim 1 and a peeling base material, the gaseous component treatment sheets are arranged on the peeling base material so that the adhesive layer is in contact with the peeling base material.

8. An electroluminescent element comprising the gaseous component treatment sheet according to claim 1.

9. A display comprising the electroluminescent element according to claim 8.

10. The electroluminescent element according to claim 8, wherein the particulate remover has a function of removing at least one component selected from the group consisting of water vapor, oxygen and an organic vapor.

11. The electroluminescent element according to claim 8, wherein the protective layer is a monolayer laminated directly on the base film and the protective layer reinforces the base film.

12. The gaseous component treatment sheet according to claim 1, wherein the protective layer is a monolayer laminated directly on the base film and the protective layer reinforces the base film.

* * * * *